March 31, 1931.  A. W. FREHSE ET AL  1,798,935
BRAKE SHOE
Filed Oct. 13, 1927  2 Sheets-Sheet 1
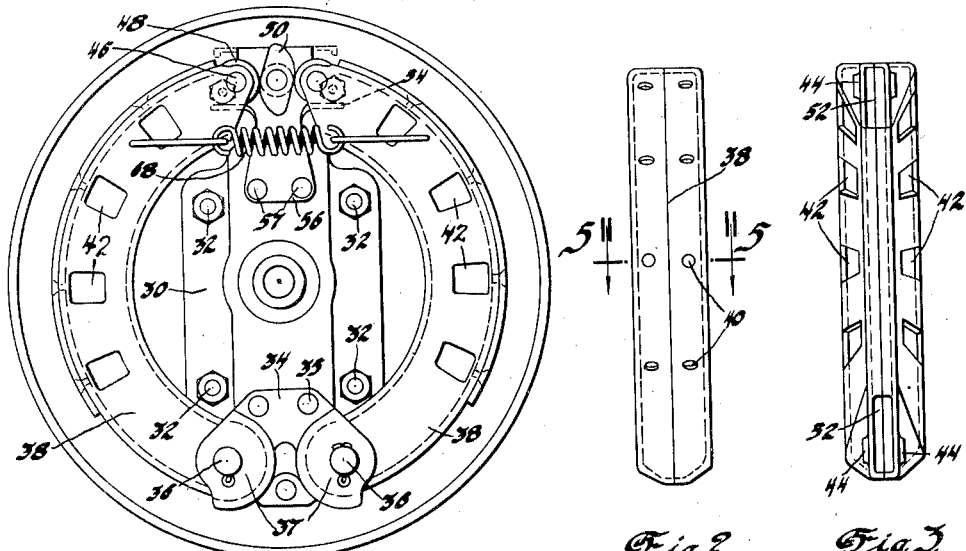
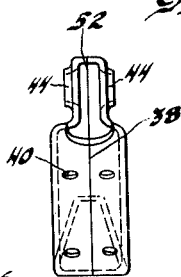
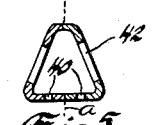
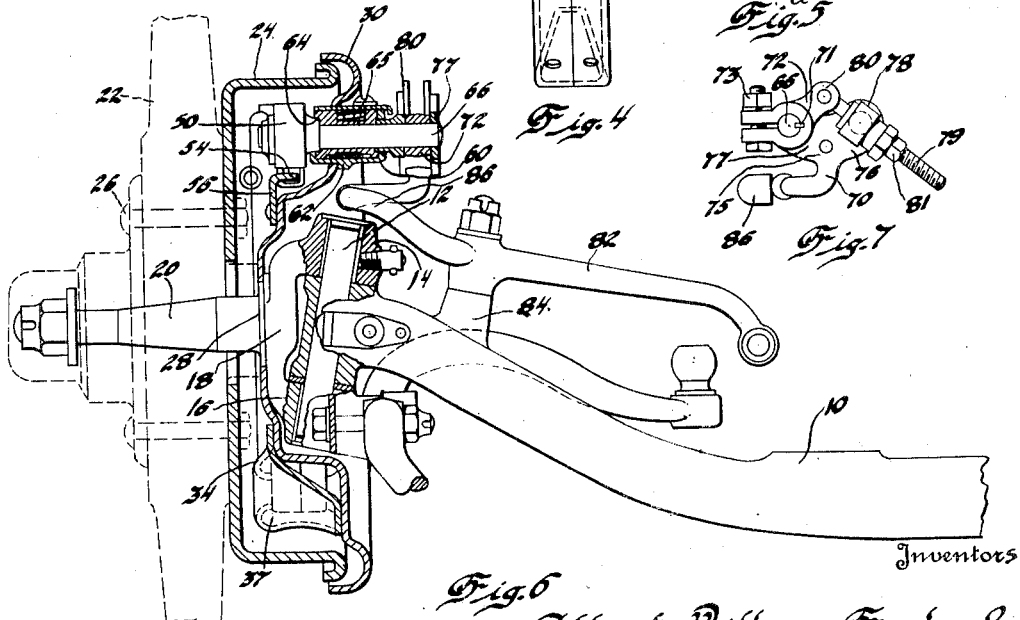
Inventors
Albert William Frehse &
Clements G. Belden
By Blackmore, Spencer & Hulbert
Attorneys

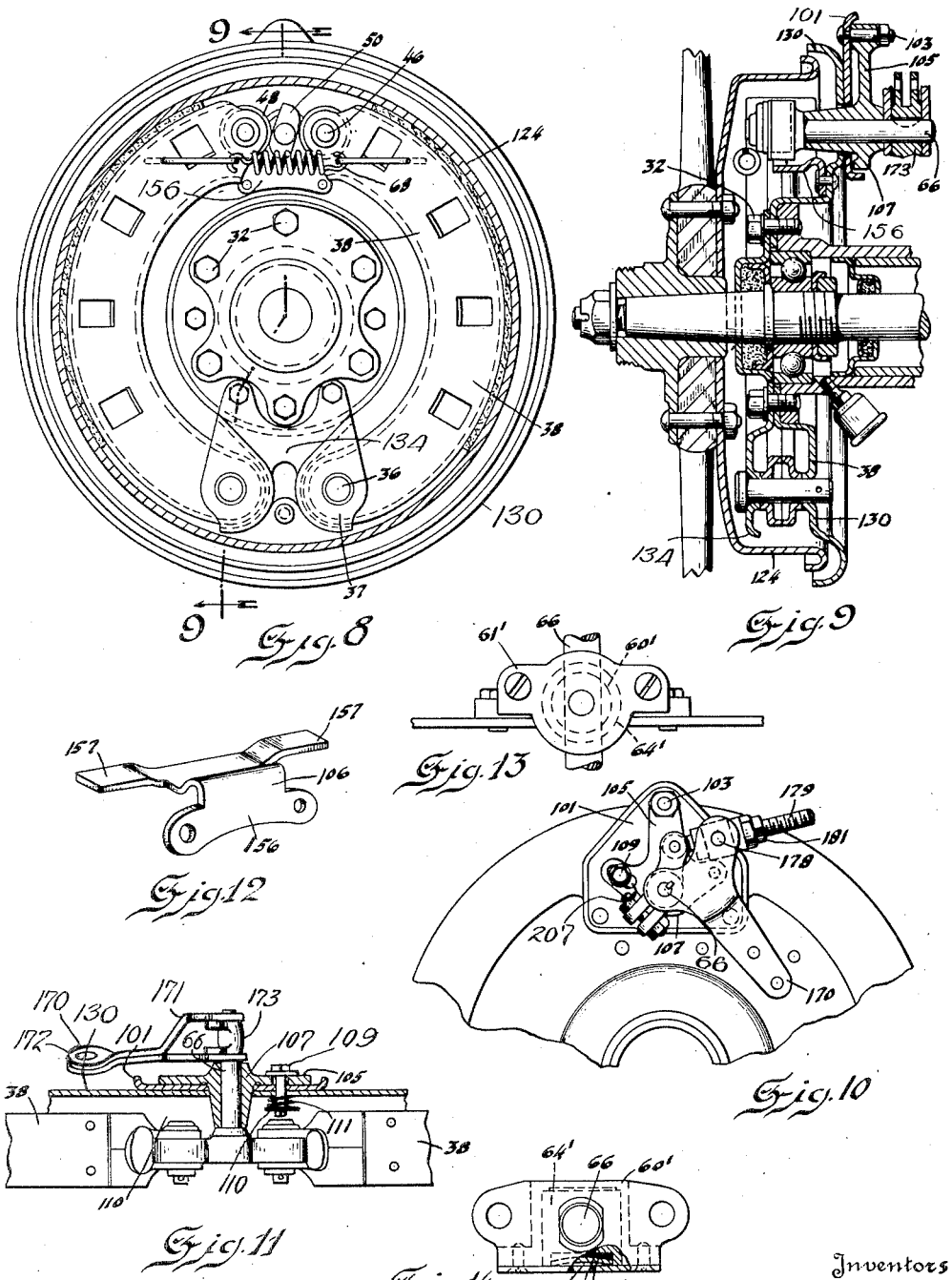

Patented Mar. 31, 1931

1,798,935

UNITED STATES PATENT OFFICE

ALBERT W. FREHSE AND CLEMENTS G. BELDEN, OF DETROIT, MICHIGAN, ASSIGNORS TO GENERAL MOTORS CORPORATION, OF DETROIT, MICHIGAN, A CORPORATION OF DELAWARE

BRAKE SHOE

Application filed October 13, 1927. Serial No. 225,921.

This invention relates to brakes. An internal shoe brake has been designed more particularly for use on vehicles. It is contemplated that the brake shall be used on both front and rear wheels. It will be understood, however, that the novel brake may be elsewhere used.

The invention includes novel brake shoe construction, advantageous both from the point of view of manufacture and in use. With it is used novel brake actuating means designed to provide equalized pressure upon the two shoes within a drum. The structure designed in accordance with this invention so operates that the front wheels may be turned n steering with no interference with the brake when the latter is in applied position It also has been so designed that actuating mechanism within the drum may be employed which will automatically accommodate itself to unequal wear of linings without interfering with the operating mechanism outside the drum. Convenient provision for adjustability is provided outside the drum which shall not interfere in any way with the operating mechanism. Other objects and advantages will be obvious, as set forth in the following description.

In the drawing:

Fig. 1 is a side elevation of front wheel brake mechanism, with the wheel removed.

Fig. 2 is a view of the brake shoe in elevation facing the lining carrying portion.

Fig. 3 is an elevation of the shoe facing its inner side.

Fig. 4 is a view of the shoe in end elevation.

Fig. 5 is a cross section on line 5—5 of Fig. 2.

Fig. 6 is a view of the front axle and wheel carrying spindle in elevation, parts being broken away and in section.

Fig. 7 illustrates in detail, the adjustment for the cam shaft.

Fig. 8 is an inside elevation of the rear wheel brake mechanism.

Fig. 9 is a transverse section on line 9—9 of Fig. 8.

Fig. 10 is a view in elevation from the right side of Figure 9, showing the adjusting mechanisms for the cam shaft, as used with the rear wheel brake.

Fig. 11 is a plan view of the brake operating mechanism, parts in section.

Fig. 12 illustrates in perspective a retaining means.

Fig. 13 is an inverted plan view of a modified form of centralizing device.

Fig. 14 is a view in elevation of the same.

Referring by reference characters to the drawing, the front axle is designated by 10. Steering knuckle 18 is swivelled to axle 10 by means of a king pin 12 passing through alined openings in the end of the axle 10 and in knuckle arms 14 and 16. The steering knuckle is formed with the usual stub axle 20 for the front wheel 22. On the inner side of wheel 22 is secured as by bolts 26, a brake drum 24. Surrounding the knuckle and piloted on a shoulder 28 is a backing plate 30. Bolts 32 securely fix the backing plate in position on the knuckle so that it turns with the wheel in steering.

It will be understood that this backing plate carries the anchors for the brake shoes and also the actuating means for the shoes. Referring now to the anchoring means, an auxiliary plate 34 is secured to the backing plate by suitable fastening means 35. The shape of the auxiliary plate is such that when attached to the backing plate two recesses or pockets are formed, defined by the backing plate 30 and auxiliary plate 34 there being registering apertures in said plates to support pivot bolts 36 for the two shoes. For the purpose of forming suitable bearings the metal of the plates 30 and 34 at the apertures may be drifted out as shown at 37 in Fig. 6. Pivoted on pivot bolts 36 are shoes 38 which are to engage the rotating drum 24.

carried by the wheel to stop or check its rotation.

The brake shoes shown in Figs. 2-5 inclusive are each made in the form of a closed box from sheet metal. Each shoe is made up of two channel shaped stampings having a web of arc shape and side flanges. For the greater part of the length of the shoe the dimensions of the two flanges are unequal. Two such halves are placed together to make a closed shoe, the flanges of greater dimensions along the outer face. The halves are welded together along the median lines. The cleavage line a—a (Fig. 5) illustrates the shape of each half shoe. Rivet holes 40 are made in the outer wall for securing the usual lining. Openings 42 are formed at suitable intervals on each half to provide access to the interior for attaching the lining by rivets. At the ends of the shoes its trapezoidal shape (shown best in sectional view, Fig. 5) is flattened as shown in Fig. 3 and Fig. 4. At these points the walls are apertured and the metal drifted out to form bearing portions 44. At the anchor end the bearing portions 44 are associated with bearing portions 37 of the plates 30 and 34 in providing the pivoted connection for the shoes. At the other end, pins 46 are carried by the shoes and upon the pins 46 are rollers 48. It is the function of these rollers to be engaged by the actuating cam 50 in the movement of the shoes into contact with the drum. Adjacent the ends of the shoes engaged by the cam the backing plate is provided with a plate 56 secured by fastening means 57. This plate 56 is formed with wings 54 entering openings of like axial extent in the shoes. This provision prevents any transverse movement of the shoes, while freely permitting the movement of the shoes to and from brake applying position.

The backing plate 30 at a point above the king pin carries a housing 60 suitably secured thereto. Within the housing 60 is a centralizing fulcrum member 64 having a bearing opening in which is journalled a cam shaft 66, carrying the cam 50. The shapes of the housing 60 and fulcrum member 64 are such that the latter may rotate within the former on a vertical axis. In such movement it will be seen that the cam may move substantially circumferentially to accommodate itself to unequal wear of the linings of the two shoes. For the purpose of restraining too free movements of the fulcrum member 64 in the housing and of retaining the cam shaft in new positions of adjustment, a coil spring 65 is located in a recess of the fulcrum member which spring engages an overlying part of the housing 60 as shown in Fig. 6. It will be understood that this use of a coil spring is intended as illustrative and that any known kind of resilient means, as rubber, may be used, if preferred.

In the modified form shown in Fig. 13 and Fig. 14 the housing is designated as 60′. To it is secured a cover 61′. Within the housing rotates a centralizing fulcrum member 64′ carrying the cam shaft as before. The fulcrum member is recessed beneath the cam shaft and a rubber block 65′ held by bent plate 67′ positioned under pressure serves the purpose of spring 65 of the first form.

For rotating the cam and cam shaft about the longitudinal axis of the latter in the act of brake application, the shaft is provided with an arm 70. It is desirable to provide for positions of adjustment of the cam shaft relative to its arm 70. Adjustment at this point may be made to correct for wear of the brake shoes without changing the position of the arm 70 or any of the operating means for this arm. As a convenient means of making this adjustment the cam shaft has keyed and clamped thereto as shown at 71, 73 respectively, an arm 72. The cam shaft arm 70 has an intermediate head portion from which extends end furcations 76 and 77, one only of each of these furcations 76 and 77 appearing in Fig. 7. The furcations 77 freely surround the cam shaft and straddle arm 72. Between the furcations 76 is trunnioned a sleeve 78, through which passes the threaded shank of an adjusting bolt 79, the head of which is rotatably carried by the furcations 80 of fixed arm 72. Suitable adjusting and lock nuts 81 on shank 79 provide for varying the position of fixed arm 72 and cam shaft 66 relative to the operating arm 70. Arm 70 is as shown outwardly bent and is extended to a point where its end to be operatively engaged in the act of brake application lies in the extension of the axis of swinging of fulcrum member 64. By this means the cam shaft may move so that its cam accommodates itself to varying conditions of self-actuation and lining wear without in the least interfering with the relation between the actuating mechanism and the operating mechanism.

For the purpose of applying the brake a lever 82 may be pivoted at 84 on the axle. The operating end 86 of the lever is intended to effect the rotation of the cam shaft through the swinging of its arm 70 as will be obvious. The adjustment may be so made that the end 86 of lever 82 may lie in the extension of the axis of king pin 12 when the brake is applied. If so arranged, it is obvious that the swivelling of the wheels in steering will not effect the intensity of brake application. It may be observed that it is not at all necessary that the king pin axis and the axis of rotation of fulcrum 64 coincide. As a matter of fact, they are not so shown. The fulcrum 64 for the cam shaft is capable of other locations than that shown, it being only necessary that its arm 70 be so positioned that its point of engagement with operating mechanism, whatever that be, shall lie in the axis of rotation of the fulcrum member. With this arrangement the cam is free to move to automatically compensate with no interference with the actuating mechanism.

For the rear axle, similar provisions are made except that no provisions for wheel swivelling are required. In Figs. 8 and 9 inclusive the backing plate 130, the auxiliary plate 134, the drum 124, the shoes 38, plate 156 and spring 68 are substantially like the corresponding parts for the front wheel. A modified and simpler form of self-adjustment for the cam is employed in the case of the rear axle since no provision of wheel swivelling has to be made. Backing plate 130 has secured thereto and projecting therefrom a plate 101, to which is pivoted at 103 a swinging arm 105 having an enlarged portion 107 providing a journal for the cam shaft 66 corresponding with cam shaft 66 of the front wheel brake. The cam is thus given freedom of movement within the drum between the ends of the shoes. This freedom may be restricted and limited as follows: The swinging arm 105 is shown in Fig. 10 as formed with a slot 207. A bolt 109 passes through the slot and through registering openings of the plates 101 and the backing plate 130 and surrounding the bolt between the backing plate and a suitably held washer 110 is a coil spring 111. The slot thus limits the extent of movement of the cam shaft and cam and the spring 111 restrains the freedom of movement and tends to hold the cam in any position of automatic adjustment it may have assumed. In Fig. 12 the plate 156 bears the same relation to the backing plate as does plate 56 on the front wheel brake and its wings 157 are similarly related to the shoes.

The adjustment of the arm 170 relative to the cam shaft is substantially the same as in the case of the front wheel brake. A pair of stampings 171 and 172 constitute the equivalent of arm 70. At one end the stampings are spaced to straddle the fixed arm 173 keyed to the cam shaft as shown in Fig. 9 and Fig. 11. The fixed arm 173 carries pivotally an adjusting bolt 179 which is adjustably related to the spaced arms of the arm 170 by the trunnion 178 and adjusting nuts 181 as in the form before described. In view of the close analogy between the front end rear brake mechanisms, it is believed that no more detail explanation of the construction and operation of the rear brake need be given.

For operating the brake suitable operating connections will be associated with lever 82 or its equivalent and with lever 170. It is deemed best that the brakes on all four wheels be applied as "service" brakes. Under such circumstances suitable linkage not forming a part of the invention herein described and claimed may be employed. Since such linkage may take various forms, it has not been deemed necessary to here illustrate or describe the particular form which we intend to use.

Among the advantages which this invention secures, are reduction in cost of brake shoes and efficiency in use. It is found that by the process of making such shoes, the shoes under influence of heat do not tend to lose conformity to the drum surface. The adjustment of the cam shaft relative to its arm possesses the obvious advantage of avoiding interference with the operating mechanism. The floating cam of the front wheel is so arranged that it is free to accommodate itself to the shoes without affecting the brake actuation mechanism. The shoes are given a reinforced anchor by means of the plate 34, and are restrained from undesirable transverse movements by the plate 56.

Another feature of this novel brake which should not be overlooked, is the relation of the backing plate and the brake drum to prevent the entrance of water and other foreign matter. It will be seen that the outer periphery of the backing plate and of the drum are bent outwardly into parallelism and into parallelism with the wheel axis. This very effectively keeps out rain, snow and mud and renders the brakes effective in all kinds of weather.

These many desirable features are accomplished for the most part by the means of members which may be cheaply and economically formed by stamping from sheet metal.

We claim:

1. A brake shoe of arc shape, generally trapezoidal in cross section and composed of two channel shaped members secured with their channels face to face the edges of the channel flanges being in abutting relation.

2. A brake shoe comprising two channel members positioned face to face, one pair of mating flanges forming a lining carrying surface.

3. A brake shoe comprising two arc shaped channel members, each channel member consisting of a web and parallel flanges, the two channel members secured together with their webs remotely positioned and the edges of the channels in abutment to form a box shaped shoe.

4. A brake shoe, as defined in claim 3, one of the flanges of each channel being of greater height than the other and the flanges of greater height adjoining to make a shoe of generally trapezoidal shape.

5. A brake shoe comprising two arc-shaped channel members, each channel member consisting of a web and parallel flanges, the two channel members secured together with their webs remotely positioned and the channels face to face to form a box-shaped shoe, one of the flanges of each channel being of greater height than the other and the flanges of greater height adjoining to form a lining carrying surface.

6. A brake shoe comprising two arc shaped channel members, their channels face to face and welded together longitudinally along the mating edges.

7. A brake shoe formed as a closed box of arc shape and provided with spaced openings to permit access to the interior for securing the lining rivets.

In testimony whereof we affix our signatures.

A. W. FREHSE.
C. G. BELDEN.